April 10, 1962   H. J. PESSL ET AL   3,028,662
METHOD FOR FORMING AND COATING PARTS
Filed April 17, 1956   2 Sheets-Sheet 1
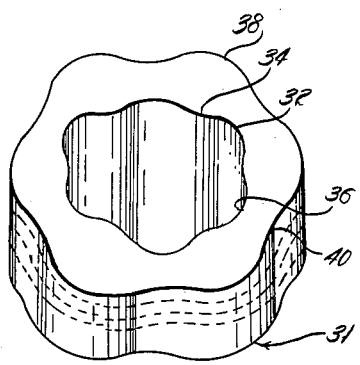
*Fig.1*
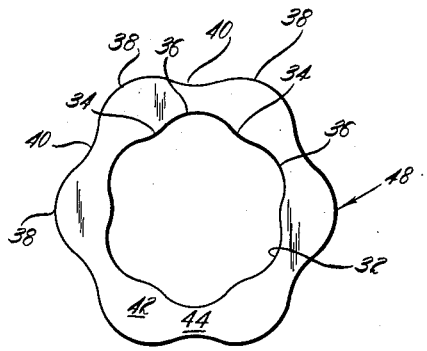
*Fig.2*
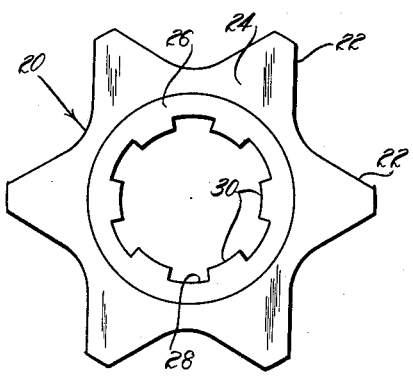
*Fig.3*
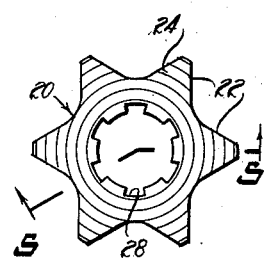
*Fig.4*
*Fig.5*
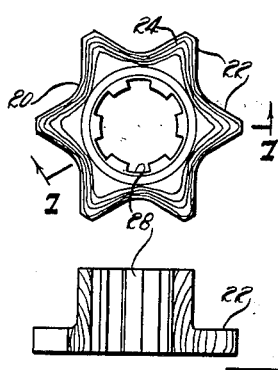
*Fig.6*
*Fig.7*
INVENTORS
HUBERT J. PESSL
H. LEE BRANDENBURG
PAUL J. COLEMAN
BY
Strauch, Nolan & Neale ATTORNEYS April 10, 1962  H. J. PESSL ET AL  3,028,662
METHOD FOR FORMING AND COATING PARTS
Filed April 17, 1956  2 Sheets-Sheet 2

INVENTORS
Hubert J. Pessl
H. Lee Brandenburg
Paul J. Coleman
BY
Strauch, Nolan & Neale ATTORNEYS United States Patent Office 3,028,662
Patented Apr. 10, 1962

3,028,662
METHOD FOR FORMING AND COATING PARTS
Hubert J. Pessl, Greenville, Henry Lee Brandenburg, Ionia, and Paul J. Coleman, Greenville, Mich., assignors to Hupp Corporation, Detroit, Mich., a corporation of Virginia
Filed Apr. 17, 1956, Ser. No. 578,751
3 Claims. (Cl. 29—159.2)

This invention relates to methods and apparatus for forming and coating metal parts and more particularly to methods and apparatus combining hot and cold forming operations to produce parts having improved physical characteristics to close tolerances at reduced costs.

While the methods of the present invention are of broad application and may be utilized to form ferrous and non-ferrous metal parts of a wide variety of shapes and physical characteristics, for present purposes they will be disclosed as applied to the manufacture of splined sprocket gears since it is in connection with the manufacture of such parts, which are notoriously difficult to form economically to close tolerances with known methods, that the advantages of the invention are most fully realized.

Heretofore it has been possible to produce such parts only with multiple machine operations which necessitate a relatively high capital investment, results in an objectionably high percentage of scrap, and produce a final part of relatively low strength. Generally such parts have been produced heretofore by one or more primary forming operations such as extrusion, stamping or forging together with supplementary finishing operations such as cutting, hobbing and honing. Such practices require expensive equipment and highly skilled workers and are time consuming particularly where close tolerances are observed. Further one or more of these operations invariably weakens the resulting part by destroying or interrupting the fiber or texture of the part.

In accordance with the present invention a billet is stage formed into the final part, the first forming stage being effected by hot extrusion and the second stage being effected by cold forming.

The hot and cold forming stages are, in accordance with the invention, so correlated that the desired physical characteristics imparted to the embryo part by the hot extrusion stage are retained in the subsequent cold forming operation in which the part is finally formed within dimensional tolerances not obtainable through hot extrusion alone. Thus, by hot extrusion, physical characteristics are imparted to metallic blanks which cannot be obtained in cold extrusion or other known methods. Conversely by cold forming operations as herein disclosed, close tolerances and contours which are not obtainable in hot extrusion processes may be realized without rupture of the metal fabric or interference with the metal molecular alignment established at the hot extrusion stage.

The part is formed in the second or cold forming stage with such accuracy that the expensive and time consuming machining operations usually required are eliminated. The final product of the cold forming stage may in most cases be considered as the finished product without further treatment of any kind. In some cases however it may be desirable to send part through a conventional tumbling operation to eliminate burrs or unduly sharp corners.

In the manufacture of parts such as splined gears in accordance with the invention an embryo part having substantially the same volume as the finished part is formed by hot extrusion. In some cases the hot extrusion is accompanied by piercing operation to move the central area of a substantially cylindrical billet. This tends to remove defective metals at the point of greatest concentration and render the remaining metal which forms the embryo product at the hot extrusion stage substantially free from defects. If piercing is not specified for the product the hot extrusion operation per se as is known in the art accomplishes metallurgical alignment to correct metal or alloy defects which under the procedures of other known processes are permitted to reach the final product and necessitate rejection of the products as scrap in many instances. The embryo part is so formed that excess metal in predetermined amounts is present in predetermined areas which is forced to flow smoothly in the subsequent cold forming operations into contiguous areas of the final part. The amount of deformation of the metal in the final cold forming stage is preferably well below the maximum which may be effected in a single operation without destroying the desirable grain pattern and other characteristics established in the hot extrusion stage.

While the relationship of the embryo part to the final part is carefully established nevertheless the variation in the form of the embryo part caused by ordinary erosion of the hot extrusion dies is ordinarily not objectionable in this process thus permitting use of the hot extrusion dies even after an amount of wear has occurred which would render them unsuitable for use in the ordinary forming processes of the prior art.

By thus dividing the total deformation of the billet between the hot and cold forming stage it is possible to form such parts as splined gears from steels having a hardness and toughness which render their production by cold forming alone impractical.

Usually a surface coating is applied to the embryo part as a lubricant prior to the final cold forming operation. It has been found in practice that because of the relatively large surface areas presented by the embryo part, the usual zinc compound lubricants being more efficiently distributed thereover prevent scoring, die erosion, reduce friction and lessen the pressures required because lubricants extend over the increased and complete surface presented by the embryo of this invention. It has also been found that when a lubricant coating is formed, for example, predominantly of metallic zinc, a coating of high zinc content will be impregnated throughout the surfaces of the final part to form a permanent residual protective, corrosion inhibiting coating.

In view of the foregoing it is the principal purpose and object of the present invention to provide novel methods and apparatus for forming metal parts by combining hot and cold forming operations in a unique manner thereby producing, at reduced cost, parts having improved physical characteristics to close dimensional tolerances.

It is also an object of the present invention to provide novel methods and apparatus for manufacturing by hot and cold pressure forming stages parts which have heretofore been manufactured by successive machining operations.

It is further object of the invention to provide novel methods for forming parts by hot and cold pressure forming operations which are so correlated with respect to the deformation effected in each operation that the final part retains the desirable characteristics imparted by each forming operation.

It is an additional object of the present invention to provide novel methods and apparatus for forming parts by successive hot and cold pressure forming operations which permits the use of relatively low forming pressures in both operations thus decreasing the cost of the forming equipment and permitting its use for a relatively large number of forming operations.

It is also an object of the present invention to provide novel methods and apparatus for pressure forming metallic parts and simultaneously imparting a corrosion resistant coating uniformly to the surface of the finished part.

It is a further and more specific object of the present invention to provide novel methods and apparatus for forming metal parts by successive hot and cold forming operations in which the embryo part produced by the hot forming operation is overformed with respect to the final part, the overformed areas of the embryo part being caused to flow smoothly into contiguous regions of the final part in a manner to preserve the desirable metal fibre established in the hot forming stage.

It is also an object of the present invention to provide novel methods and apparatus for forming metal parts by successive hot extrusion and cold forming stages to produce parts having a surface finish and strength and texture not obtainable by the use of hot extrusion and known supplemental cold drawing and/or machining operations.

It is another object of the present invention to provide novel methods for forming metallic parts by successive hot extrusion and cold forming operations, the two operations being so correlated that in the cold forming operation, metals of appreciably higher carbon content and appreciably harder surface characteristics can be produced than heretofore possible.

It is also an object of the present invention to provide improved methods and apparatus for forming metallic parts by successive hot extrusion and cold forming stages in which the cold forming stage is utilized in a unique manner to negative the effects of die erosion in the hot forming stage to correct disparities in the embryo part produced in the hot forming stage and to bring the part to final contour within tolerances heretofore possible only through multiple machining operations.

Additional objects and advantages will become apparent as the description proceeds in connection with the accompanying drawings in which:

FIGURE 1 is perspective view of the billet resulting from the first or hot extrusion forming stage;

FIGURE 2 is an end elevation of the embryo part cut from the billet of FIGURE 1;

FIGURE 3 is an end elevation of the final part;

FIGURES 4 and 5 are corresponding sections of a part formed by prior art methods;

FIGURES 6 and 7 are respective transverse and axial sections of the final part showing the metal flow lines;

Figure 8:
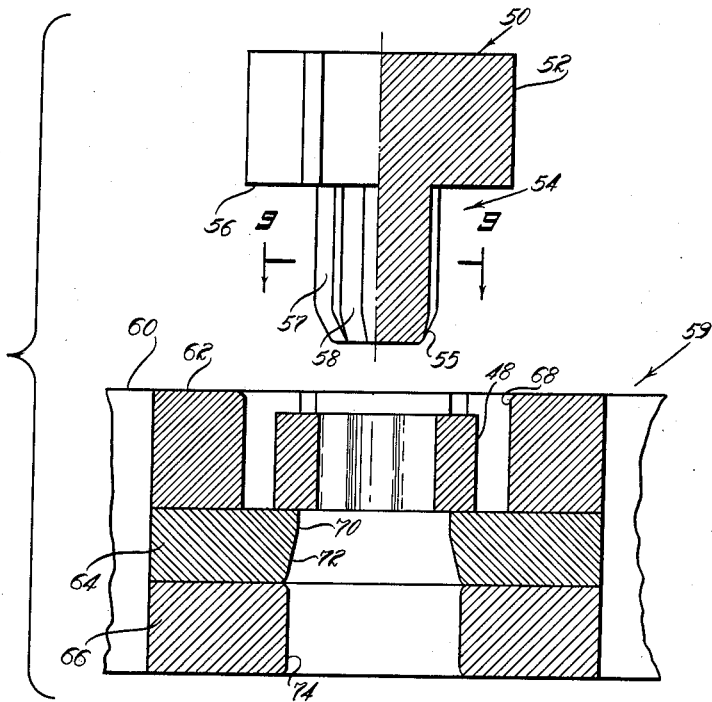
FIGURE 8 is a sectional view and also in partial elevation showing the configuration of the die and punch utilized in the cold forming stage.

Referring now more particularly to the drawings, the part selected for purposes of illustrating the application of the methods of the present invention is a gear having a splined hub as best shown in FIGURES 3, 4 and 5. Prior to the present invention such parts were formed by a series of operations including relatively expensive multiple machining operations.

The final part indicated generally at 20 includes a plurality of gear teeth 22 formed on a gear body section 24. An integrally formed hub 26 having a substantially cylindrical outer surface projects from one side of the gear body 24. A central opening 28 of uniform section extends through the gear body 24 and the hub 26 and is formed with a plurality of internal splines 30 with intervening spaces therebetween. In the particular part shown the splines 30 are equal in number to the gear teeth 22, each spline being radially aligned with a gear tooth.

In the fabrication of part 20 in accordance with the present invention a cylindrical billet indicated at 31 is first formed by hot extrusion to the configuration shown in FIGURES 1 and 2. The billet so formed has a central opening 32 of uniform section from end to end preferably formed by a piercing mandrel. The wall of the opening is formed by smoothly curved convex and concave surfaces 34 and 36, respectively. The outer surface of the billet is of similar configuration having a series of outwardly bulging or convex surfaces 38 which merge smoothly into concave or inwardly bulging surfaces 40.

It will be noted that respective surfaces 34 and 38 and 36 and 40 are radially aligned to form alternate relatively thick wall sections indicated generally at 42 and relatively thin wall sections indicated generally at 44. As shown in FIGURE 2 there are six sections 42 corresponding in number and circumferential spacing to the area in the final part defined by the gear teeth 22 and the internal splines 30. Similarly six relatively thin wall sections 44 correspond in number and circumferential spacing to the relatively thin wall sections in the final part between adjacent gear teeth 22 and adjacent splines 30. The relative configuration of the billet 31 shown in FIGURE 2 and the final part 20 shown in FIGURE 3 may be readily observed from FIGURE 9.

As is well known in the art any impurities present in metallic structures such as the original cylindrical billet from which the intermediate billet 31 of FIGURE 2 is formed are usually concentrated in the central core region of the billet. Accordingly the metal remaining in the intermediate billet after the piercing operation is usually substantially free of impurities and because of the well known characteristics of hot extrusion products has a highly desirable grain structure and texture. The exact nature of the grain structure will depend upon the carbon and alloy content of the steel and the quench given the billet upon completion of the hot extrusion operation. Through the use of conventional techniques substantially any desired grain size and structure can be established in the intermediate billet to render the metal particularly suitable for the subsequent cold forming operation and to produce a final part of optimum hardness and toughness.

If desired the billet shown in FIGURE 2 may be given conventional pickling and straightening treatment after it is quenched following the hot extrusion operation.

Next the billet is cut into sections on planes normal to the billet axis, the cutting lines being shown by the dash lines 46 in FIGURE 1. Embryo parts 48 are thus formed appearing in elevation as shown in FIGURE 2 and appearing in section as shown in FIGURE 8. The position of the cutting lines 46 is so selected that the volume of the embryo part 48 is substantially exactly the same as the final part.

The embryo part is finally prepared for the subsequent cold forming operation by applying a lubricant which when no corrosive resistant is desired is preferably one of the zinc phosphates which, when combined with reactive soap coatings, yields zinc stearate which is an active and effective lubricant for the conditions prevailing during the subsequent cold forming operation.

When resistance to corrosion is desired copper or zinc in proper metallic form is applied (sprayed or electrolytically deposited) to the embryo part 48, which materials of themselves also being lubricant, substitute for the foregoing zinc phosphate lubricant and serve the twofold purpose of effective lubricant and corrosive resistant coating.

Figure 9:
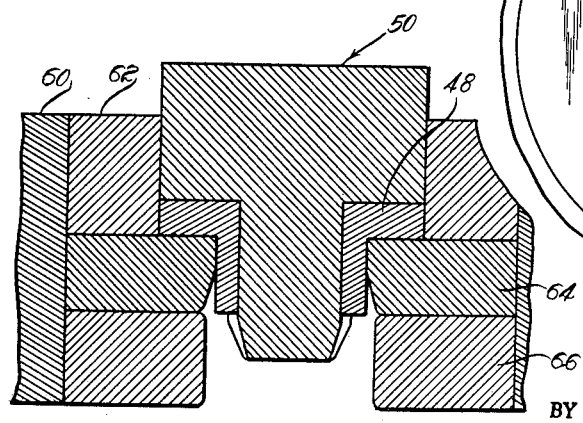
FIGURE 9 is a section taken along line 9—9 of FIGURE 8 illustrating the relation of the contour of the embryo part and the contour of the cold forming punch and die.
Figure 10:
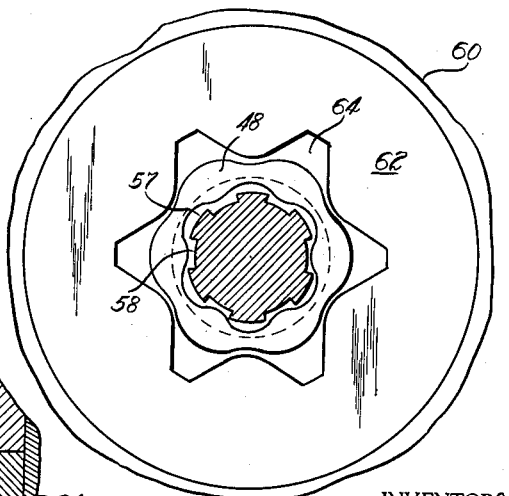
FIGURE 10 is a view of the cold forming apparatus at the conclusion of the forming operation.

The cold forming operation is performed by the punch and die set shown in FIGURES 8, 9 and 10. The punch indicated generally at 50, has a body portion 52 having the same exterior configuration as the body portion 24 of the final part. Integrally formed with the punch body section is a mandrel section 54 which has a tapered or relieved end portion 55. The portion of the mandrel 54 extending between the bottom face 56 of the body portion 52 and the tapered end portion 55 is provided with ribs 57 and intervening grooves 58 of the same configuration as the splines 30 and intervening spaces 28 in the final part.

The die set indicated generally at 59 comprises a conventional shrink ring 60 in which a form die ring 62, an extrusion die ring 64 and a back-up ring 66 are rigidly mounted by any suitable means, not shown. The form die ring 62 has a central opening 68 which conforms with the exterior of the body portion 24 of the final part. The extrusion die ring 64 has a central opening, the upper portion 70 of which is cylindrical. The lower portion 72 of the central opening in the extrusion ring 64 is flared outwardly to provide a relief section. The central opening 74 in the back-up ring 66 is not utilized in the forming operation and may be of any size and configuration sufficient to clear the punch and the work piece.

After the embryo part 48 is provided with a lubricant coating, described above, it is positioned within the opening 68 in the form die ring 60 resting on the upper surface of the extrusion die ring 64, so as to be substantially coaxial with the central openings in the two die rings. However, precise centering is not necessary since the tapered end portion of the punch 50 is effective to center the part 48 accurately when the punch initially contacts the embryo part. More important is the alignment between the respective sections 42 and 44 in the embryo part 48 with the respective portions of the openings 68 in the die ring 62 corresponding with the gear teeth and the spaces between the gear teeth so as to dispose the embryo part 48 and dies substantially in the relative position shown in FIGURE 9. It is to be understood that the punch 50 and the die ring 62 are aligned in the relation also shown in FIGURE 9 with the grooves 58 on the punch directly opposite the areas in the bore 68 of the die ring 62 corresponding to the gear teeth 22 in the final part.

With the parts in the position shown in FIGURES 8 and 9 the punch is lowered by any suitable means, not shown, to the position shown in FIGURE 10 preferably, although not necessarily, at a relatively high speed to provide a relatively heavy impact against the embryo part 48. In this operation the part is formed to final form with a dimensional accuracy which is at least equal to that maintained in the machining operations by which such parts have been formed in the past. Since, as stated above, the volume of the embryo part 48 is the same as the volume of the final part 20, no cutting or removal of metal occurs in the cold forming operation. Rather the metal of the embryo part is compressively formed and caused to flow smoothly into contiguous areas of the final part. The desired smooth flow of the metal of the embryo part during the cold forming operation is promoted by the provision of the relatively thick and thin wall sections 42 and 44, respectively, in the embryo part which correspond to portions of greatest and least radial thickness in the final part. Accordingly no metal is forced to flow circumferentially of the part during the cold forming operation, substantially the entire flow being effected in an axial or radial direction.

The thickness and radial dimensions of the embryo part are preferably so selected that the space between the punch 50 and the formed die ring 62 is substantially exactly filled when the punch reaches its lowermost position to assure that the body 24 of the final part will be fully formed and to avoid the necessity for reducing the thickness of the body portion 24 after it is fully formed to provide metal for the hub portion of the final part. This latter condition may cause failure of the metal of the embryo part and would necessitate the employment of unduly high pressures for operating the punch 50 and would greatly increase the wear rate on the punch and die.

The amount of deformation of the embryo part effected in the final cold forming stage is substantially below the critical reduction point of the material involved so that the deformation can safely be effected with one "hit" or operation of the punch 50 while maintaining or increasing the strength of the final part. In a typical case if the percentage of reduction of the cross sectional area and diametric change necessary to form the final part from a cylindrical part is considered to be 70%, and the nature of the metal is such that a 40% reduction may be effected in the final cold forming stage, and a 30% reduction will be transferred to the initial hot extrusion stage. Accordingly, the relation of the configuration of the hot extrusion dies and the cold forming punch and die set will depend on the material involved, a greater percentage of deformation being effected in the cold forming operation when relatively soft or highly ductile materials are involved and a relatively lesser percentage of deformation being effected in the cold forming operation when hard and tough steels, for example such steels as SAE-8620 or SAE-52 100 are involved. In all cases the optimum percentage reduction effected in each stage can be determined mathematically or empirically.

During the cold forming operation if a metallic coating such as copper or zinc is used in a form providing the zinc lubricant it will be impregnated in the surface of the part and is so distributed as to prevent scoring and provide a permanent protective coating. Because of the limited surface area in the billet used in conventional cold forming processes proper surface distribution of the coating could not be obtained. However, the embryo part of the present invention presents adequate surface area so that despite extensive cold flow, copper or zinc in the proper form and concentration will reach and be impregnated in the surface of the final part as a permanent residual coating.

One of the significant advantages of the present invention as compared with prior processes is illustrated in FIGURES 4 through 7, which show the vertical and horizontal grain flow and texture of the product of the method of the present invention and a typical finished part formed to final contour by machining in accordance with prior methods. It will be noted that the flow lines of the product of the methods of the present invention shown in FIGURES 6 and 7 are continuous and bulge outwardly into the gear teeth and bulge inwardly into the internal splines to provide a final part of maximum strength. This texture may be readily contrasted with that of a part formed by conventional prior machining operations as shown in FIGURES 4 and 5 and in which the flow lines of the metal forming the gear teeth and the internal splines are cut at the opposite sides of the gear teeth and splines thus substantially relatively reducing the strength of the final part.

From the foregoing it will be apparent that the above stated objects and the advantages have been obtained by the provision of improved methods for pressure forming and coating parts heretofore formed to final contour by multiple machining operations. Through the use of the methods of the present invention it is possible to produce metal articles of greater physical strength, remarkably improved surface finish and to more exact tolerances at reduced expense without the deteriorating and limiting effects of conventional machining operations. The parts are produced with little or no scrap. The heat treatment previously required is not necessary to produce a part substantially free of imperfections and having a grain size and texture consistent with sufficient strength. The desirable characteristics established in the embryo part when it is hot extruded in a highly plastic state under relatively low pressure are projected and preserved in the final article to an extent heretofore unknown.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of forming a spur gear having a splined hub from a billet comprising the steps of heating the billet to render the billet plastic, extruding the heated billet to form an elongated hollow tubular blank having circumferentially spaced wall portions of differing radial thickness, cutting the extruded blank in planes normal to the longitudinal axis thereof into sections to form embryo parts having substantially the same volume as the final part, positioning one of said sections in a die having gear tooth forming recesses, said relatively thicker wall portions of said section being disposed opposite said tooth forming recesses and the relatively thinner wall portions being disposed circumferentially between said tooth forming recesses, and cold forming said relatively thicker wall portions radially into said tooth forming recesses in said die when said embryo part is at a temperature substantially below the hot extrusion temperature to form said section to the final contour of said part.

2. The method of forming a gear or like part of generally circular form and having radially extending peripheral portions comprising the steps of extruding a hot billet to form an elongated hollow tubular blank having circumferentially spaced alternate relatively thick and relatively thin wall portions, severing from said extruded blank an embryo part having substantially the same volume as the finished part but being of substantially greater axial length than the main body of said finished part and having a maximum radius substantially less than the maximum radius of the finished part, and cold forming said embryo part to the contour of said finished part by compressing said part axially and permitting the radial flow of said relatively thick wall portions to form said radially extending peripheral portions of the final part when said embryo part is at a temperature substantially below the temperature at which said part is extruded.

3. The method according to claim 2 together with the additional step of applying a lubricant coating to said embryo part, said coating being distributed over the surface of said part as said part is being formed to final contour.

References Cited in the file of this patent

UNITED STATES PATENTS

| | | |
|---|---|---|
| 1,486,365 | Cummings | Mar. 11, 1924 |
| 1,948,242 | Schubarth | Feb. 20, 1934 |
| 2,120,496 | Hauger | June 14, 1938 |
| 2,239,203 | Rendleman | Apr. 22, 1941 |
| 2,583,270 | Lynall | Jan. 22, 1952 |
| 2,713,277 | Kaul | July 19, 1955 |
| 2,713,941 | Schuller | July 26, 1955 |
| 2,761,204 | Bannister | Sept. 4, 1956 |
| 2,762,115 | Gates | Sept. 11, 1956 |
| 2,769,990 | Pawsat | Nov. 13, 1956 |
| 2,785,084 | Lundin | Mar. 12, 1957 |
| 2,866,262 | Mataich | Dec. 30, 1958 |
| 2,875,511 | Hawes | Mar. 3, 1959 |